(12) United States Patent
Garrity

(10) Patent No.: US 6,174,464 B1
(45) Date of Patent: Jan. 16, 2001

(54) ORGANIC PHOTOCHROMIC CONTACT LENS COMPOSITIONS

(75) Inventor: Norman E. Garrity, Painted Post, NY (US)

(73) Assignee: Corning Incorporated, Corning, NY (US)

( * ) Notice: Under 35 U.S.C. 154(b), the term of this patent shall be extended for 0 days.

(21) Appl. No.: 09/171,397

(22) PCT Filed: Apr. 21, 1997

(86) PCT No.: PCT/US97/06776

§ 371 Date: Oct. 16, 1998

§ 102(e) Date: Oct. 16, 1998

(87) PCT Pub. No.: WO97/41468

PCT Pub. Date: Nov. 6, 1997

Related U.S. Application Data

(60) Provisional application No. 60/016,517, filed on Apr. 30, 1996.

(51) Int. Cl.$^7$ .................. G02B 5/23; C08J 3/00; G02C 7/10
(52) U.S. Cl. ............ 252/586; 523/106; 351/163
(58) Field of Search ............ 252/586; 523/106; 351/163

(56) References Cited

U.S. PATENT DOCUMENTS

| | | | |
|---|---|---|---|
| 4,306,780 | * 12/1981 | Tarumi et al. | 351/159 |
| 5,395,566 | * 3/1995 | Kobayakawa et al. | 252/586 |
| 5,808,063 | * 9/1998 | Kumar | 252/586 |
| 5,981,634 | * 11/1999 | Smith et al. | 252/586 |
| 6,034,193 | * 3/2000 | Henry et al. | 252/586 |

FOREIGN PATENT DOCUMENTS

95/10790 * 4/1995 (WO).

* cited by examiner

*Primary Examiner*—Philip Tucker
(74) *Attorney, Agent, or Firm*—Angela N. Nwaneri; Peter Rogalskyj

(57) ABSTRACT

Disclosed are photochromic contact lenses which include transparent organic materials having an index of refraction of more than 1.55. The material is prepared by radical polymerization of a polymerizable composition which includes (a) 80–95 wt % of at least one monomer represented by the general formula (I):

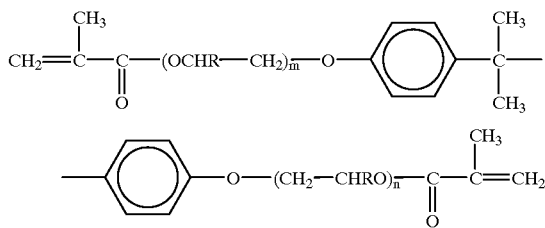

where R is H or $CH_3$ and m and n are independently 1 or 2; (b) 5–20 wt % of at least one aromatic monovinyl monomer; (c) an effective amount of at least one dye that imparts photochromic properties to the materials, selected from the groups of spiroxazines, spiropyrans and chromenes; (d) an effective quantity of a chain transfer agent; and (e) an effective quantity of a radical polymerization initiator. The chain transfer agent is a linear alkanethiol, and the radical polymerization initiator is a diazo compound.

7 Claims, No Drawings

ORGANIC PHOTOCHROMIC CONTACT LENS COMPOSITIONS

This application is a 371 of PCT/US97/06776 filed Apr. 21, 1997, and also claims the benefit of 60/016,517 filed Apr. 30, 1996.

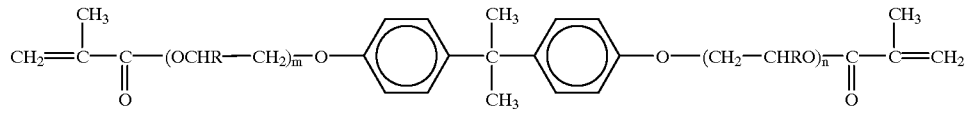

FIELD OF THE INVENTION

The invention relates to photochromic organic contact lenses.

BACKGROUND OF THE INVENTION

Even though plastic contact lenses have been available for many years, plastic photochromic contact lenses remain relatively rare. A photochromic hard contact lens is disclosed in Japanese patent publication no. JP 4-208919 (1992), and JP 63-306418 (1988).

It is desirable to have a photochromic material which can be used in the production of a contact lens whose transmittance varies as a function of light. Outside of their photochromic properties (i.e., colorability, rapid darkening and lightening kinetics, acceptable durability, etc.), such lenses are generally made by the use of appropriate mixtures of photochromic compounds. Even though the polymer matrix used for such lenses are thermally crosslinked, they tend to have a low glass transition point, generally lower than that of CR39®, a reference ophthalmic resin consisting of diethylene glycol bis(allyl carbonate) available from PPG Industries, in order to exhibit rapid photochromic kinetics. Moreover, these polymers generally have a relatively low refractive index (below 1.54).

The majority of these thermally crosslinked matrixes are obtained by radical polymerization (i.e., polymerization which most often can only be carried out provided that one uses initiators of the organic peroxide type.) The use of organic peroxides makes it practically impossible to incorporate photochromic molecules in the mixture of monomers before polymerization, the peroxides having the effect either of destroying any photochromic effect or of giving the product an unacceptable permanent intense coloration.

Therefore, there continues to be a need for photochromic organic contact lenses having improved photochromic properties and which are relatively easy to manufacture.

SUMMARY OF THE INVENTION

Briefly, the invention is directed at organic photochromic contact lenses, in particular, a plastic contact lens. The lens is composed of (1) a polymer matrix of high optical quality, and (2) at least one dye capable of imparting photochromic properties on the lens.

In one aspect, it relates to a photochromic contact lens comprising organic photochromic materials consisting of a transparent polymer having a refractive index equal to at least 1.54, and at least one photochromic dye selected from the group consisting of spirooxazines, spiropyrans, chromenes and a mixture of these, wherein the polymer is a copolymer of at least two monomers selected from the group consisting of:

(i) homopolymers of ethoxylated bisphenol A dimethylacrylate with formula I:

where R is H or $CH_3$, and m and n independently represent 1 or 2;

(ii) ethoxylated bisphenol A dimethylacrylate containing at most 30 weight percent of an aromatic monomer with vinyl, acrylic or methacrylic functionality;

(iii) an aromatic monovinyl monomer represented by the general formula (II):

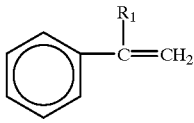

in which $R_1$=H or $CH_3$ (iv) an aromatic divinyl monomer represented by general formula (III):

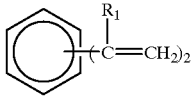

in wnich $R_1$=H or $CH_3$;

(v) a polyurethane oligomer with terminal di- or triacrylic or di- or trimethacrylic functionality, (vi) a (meth)acrylic monomer corresponding to the general formula:

$$CH_2=C(R)-COOR'$$

in which R=H or $CH_3$,

R' is a straight-chain or branched $C_4$ to $C_{16}$ alkyl radical, an alkylaryl radical, or a polyethoxylated group with formula $-(CH_2-CH_2O)_nR''$ in which n=1 to 10 and $R''=CH_3$ or $C_2H_5$;

(vii) styrene; and (viii) divinylbenzene;

(ix) diallyl phthalate;

(x) benzyl methacrylate;

(xi) benzyl acrylate;

(xii) naphthyl methacrylate; and (xiii) naphthyl acrylate.

In another aspect, the invention relates to a photochromic contact lens in which the polymer is a copolymer selected from the group consisting of divinylbenzene, diallyl phthalate, benzyl methacrylate, benzyl acrylate, naphthyl methacrylate and naphthyl acrylate, and their derivatives substituted on the aromatic nuclei by chlorine or bromine atoms.

DETAILED DESCRIPTION OF THE INVENTION

The organic photochromic contact lens of the invention can be either hard or soft, and can be prepared from inventive organic photochromic materials having properties appropriate for contact lens applications such as, surface wettability, oxygen permeability, and suitable hydrophilic properties. It is also desirable that the photochromic dyes have the proper solubility, dispersability and stability for contact lens applications in order to obtain consistent or uniform photochromicity.

The lens is made of a plastic host (polymer matrix), a photochromic compound or a mixture of photochromic compounds, a stabilizer, and optionally, a stabilizer. The polymer matrix of the inventive contact lens can be thermally crosslinked, free of optical distortion, and is able to receive, and be cross-linked in the presence of an appropriate mixture of photochromic dyes. In addition, the resulting lens exhibits a high initial transmission before exposure as well as a high capacity to rapidly darken after exposure. Also, the lens rapidly lighten when the light source is eliminated. Preferably, the material has a low thermal dependence, a high resistance to fatigue, and a high index of refraction. In a preferred embodiment, the index of refraction is at least 1.54, more preferably, at least 1.55.

Examples of useful organic photochromic materials for the contact lens for the invention include the compositions disclosed in co-assigned, U.S. provisional patent application serial no. 60/000,829, titled "Temperature Stable and Sunlight Protected Photochromic Articles," by Florent et al. (Florent I); U.S. provisional application serial no. 60/001, 677, titled "Organic Photochromic Materials with High Refractive Index," by Chan et al.; U.S. provisional application no. 60/004,492, titled "Novel Photochromic Organic Materials," by Henry et al.; and U.S. provisional application no. 60/011,429, titled "New High Index Ophthalmic Plastic Lenses," by Florent et al. (Florent II), all herein incorporated by reference.

In general, the organic materials are composed of a plastic host, photochromic compounds, and a stabilizer. Examples of useful hosts (polymer matrix), and photochromic compounds for the invention are discussed below.

Florent I discloses transparent organic photochromic materials having high refractive index, formed from a polymer matrix, which matrix can consist of a homopolymer of ethoxylated bisphenol A dimethacrylate having the formula I:

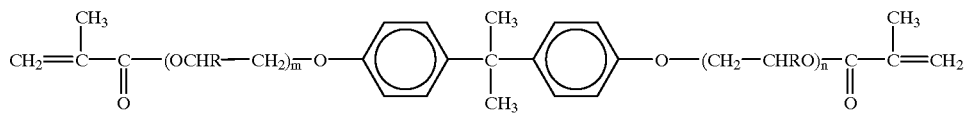

where R=H or $CH_3$, and m and n independently represent 1 or 2, and where optionally, the dimethacrylate is modified up to 30 wt % with an aromatic comonomer with vinyl, acrylic or methacrylic functionality, and where the material contains at least one dye that imparts photochromic properties to the matrix, the dye being selected from spirooxazines, spiropyrans and chromenes. These materials can be prepared by polymerizing a methoxylated bisphenol A dimethacrylate having formula I, optionally in the presence of one or more aromatic monomers with vinyl, acrylic or methacrylic functionality, in the presence of a diazo radical initiator, such as azobisisobutyronitrile, and in the absence of a peroxide radical initiator.

Because of the absence of a peroxide initiator, it is possible to incorporate one or more photochromic dyes, selected from spirooxazines, spiropyrans and chromenes, directly into the polymerizable monomer to obtain a matrix which is dyed in bulk. It is also possible to polymerize the polymerizable mixture containing the monomer and the photochromic dye in a lens mold to obtain directly a photochromic lens. In a variant, Florent I also discloses that it is possible to polymerize the monomer without dye and to subsequently dye the matrix obtained (which matrix can be in the form of a lens for example), using photochromic dyes, for example by a method of thermal diffusion, as described in U.S. Pat. Nos. 5,130,353; 5,185,390; and 5,180,254 for example. Typically in a thermal diffusion process, a substrate which is impregnated with one or more photochromic dye is applied to one side (usually the convex side in the case of a lens) of the polymer matrix, and the mixture is heated at 100–150° C. for 1 to 3 hours, and finally the substrate is separated from the matrix. The matrix of Florent I exhibits essentially constant photochromic characteristics.

The organic photochromic materials disclosed in Chan et al., are particularly useful in applications where it is desired to obtain contact lenses having adjustable photochromic properties. Chan et al. disclose organic photochromic materials consisting of a polymer matrix with optical quality, having a refractive index of at least 1.54 and containing at least one dye that imparts photochromic properties to the matrix, the dye being selected from spirooxazines, spiropyrans and chromenes. The polymer that constitutes the matrix is a copolymer consisting of (i) 30–95 wt % ethoxylated bisphenol A dimethacrylate having the following formula I:

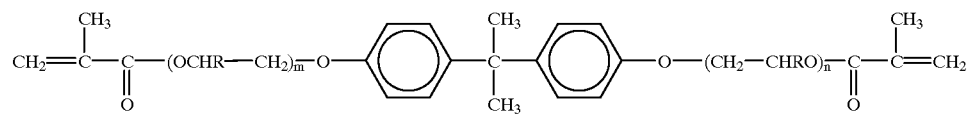

where R=H or CH$_3$, and m and n represent independently 1 or 2, and (ii) 5–70 wt. % of a polyurethane oligomer with terminal di- or tri-acrylic or di- or tri-methacrylic functionality, in the presence of a diazo radical initiator and in the absence of peroxide radical initiator. Changes in the properties of the polymer matrix result in the adjustment of the photochromic properties of the material. Accordingly, the kinetics of photochromic darkening and lightening tend to slow down when the glass transition temperature and the hardness of the matrix increase. On the other hand, the heat dependence of the photochromic properties decreases as the glass transition temperature and the hardness of the matrix increase.

Henry et al. disclose a transparent photochromic organic material having a refractive index greater than 1.55 and free of optical distortions, obtained by radical polymerization of a polymerizable composition containing:

a) 80 to 95 wt % of at least one monomer represented by general formula (I):

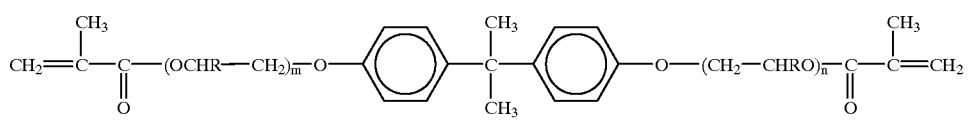

in which R=H or CH$_3$, and m and n are independently 1 or 2;

b) 5 to 20 wt % of at least one aromatic monovinyl monomer represented by general formula (II):

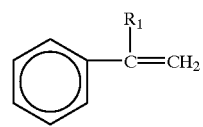

R$_1$ = H or CH$_3$ c) an effective quantity of at least one coloring agent giving the material photochromic properties, chosen from the group of the spiroxazines, spiropyrans and chromenes;

d) an effective quantity of a chain transfer agent; and e) an effective quantity of a radical polymerization initiator; characterized by the fact that the chain transfer agent is a straight-chain alkanethiol, and the radical polymerization initiator is a diazoic compound, as well as a process for preparation of these photochromic materials and photochromic articles consisting of these materials.

According to an optional embodiment, the polymerizable composition of Henry et al., further incorporates, up to 10 wt % of an aromatic divinyl monomer represented by the general formula (III):

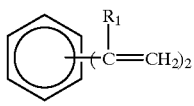

in which R$_1$=H or CH$_3$.

Florent II discloses a new transparent organic material having a refractive index greater than 1.55 and which are free of optical distortions, characterized by the fact that they consist of a copolymer of:

a) 55 to 90 and preferably 55 to 70 wt % of units derived from at least one monomer represented by general formula (I):

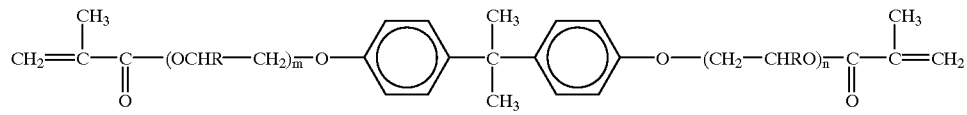
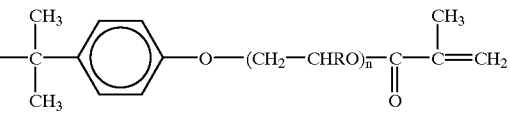

in which R=H or CH$_3$, and m and n are independently 1 or 2;

b) 10 to 30 and preferably 15 to 25 wt % of units derived from at least one aromatic monovinyl monomer represented by general formula (II):

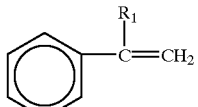

R$_1$ = H or CH$_3$ c) 0.1 to 10 and preferably 2 to 6 wt % of units derived from an aromatic divinyl monomer represented by general formula (III):

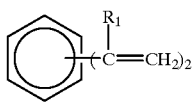

in which R$_1$=H or CH$_3$;

d) 1 to 20 and preferably 5 to 15 wt % of units derived from at least one (meth)acrylic monomer corresponding to the general formula:

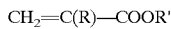

CH$_2$=C(R)—COOR' in which R=H or CH$_3$,

R' is a straight-chain or branched $C_4$ to $C_{16}$ alkyl radical, an alkylaryl radical, or a polyoxyethoxylated group with formula —$(CH_2—CH_2O)_nR''$ in which n=1 to 10 and R''=$CH_3$ or $C_2H_5$, and e) optionally, an effective quantity of at least one coloring agent giving the glass photochromic properties, chosen from the group of the spiroxazines, spiropyrans and chromenes. As used herein, the term "(meth)acrylic" means acrylic or methacrylic.

Optional constituent e) may be incorporated in the polymerizable composition to obtain directly, after polymerization, a matrix with photochromic properties. It is also possible to produce a photochromic matrix by preparing a nonphotochromic matrix by polymerization, and then later giving it photochromic properties, for example, by diffusion of a photochromic coloring agent, as is well known in the art.

Monomers (a) of formula I are well known and are available commercially. For example, a monomer with formula I in which R=H and m and n=2 is marketed by Akzo under the trade name Diacryl 121. Styrene and methylstyrene are examples of monomers (b) of formula II. Monomers (c) of formula III are represented by divinylbenzene and di(methylvinyl)benzene, for example. The (meth)acrylic monomers (d) are also well-known products which are commercially available. Examples include, the butyl, pentyl, hexyl, heptyl, octyl, and 2-ethylhexyl (meth)acrylates, and ethyltriglycol (meth)acrylate.

By an appropriate choice of monomers (a), (b), (c) and (d) and of their proportions, it is possible to adjust the kinetic parameters of the final photochromic contact lens (speed of darkening, speed of lightening) as needed: the addition of a monomer (b) such as styrene to the dimethacrylic compound (a), besides its beneficial effect on the optical properties, makes it possible to slow the kinetics of the coloring agents which would be intrinsically too fast in the methacrylic matrix. Inversely, the incorporation of the third monomer (c), such as divinylbenzene, allows one to accelerate a coloring agent which would be too slow in the methyacrylic matrix. Thus, by the right choice of the monomer (b) monomer (c) weight ratio, in a dimethacrylic matrix as described, it is possible to adjust the kinetic parameters of the photochromic process to a desired value, without altering the optical quality of the materials obtained, while maintaining a high refractive index. The incorporation of the fourth monomer (d) in the proportions defined allows one to obtain more easily thick lenses which are free of optical defects (distortions, stresses, cords, etc.) without altering properties such as the glass transition temperature $T_g$, the impact strength, or the refractive index.

The optional photochromic coloring agent (e) can be chosen from the general classes of the spiroxazines, spiropyrans and chromenes which have photochromic properties. Quite a few photochromic coloring agents of this type are described in the literature and are available commercially.

In general, the refractive index of the photochromic material can be adjusted to a desired value by the use of an appropriate modifying co-monomer such as vinyl, acrylic or methacrylic compounds containing in their formulae, one or more benzene nuclei, for example, divinylbenzene, diallyl phthalate, benzyl methacrylate, benzyl acrylate, naphthyl methacrylate and naphthyl acrylate, and their derivatives substituted on the aromatic nuclei by chlorine or brimine atoms.

Either one or a combination of photochromic components or coloring agents can be used to obtain a desired tint. Preferably, the total amount of coloring agents added to the matrix is in the range of 0.03 to 0.3 wt. %, more preferably, in the range of 0.05 to 0.1 wt. %. Examples of useful photochromic coloring agents for the invention include:

Coloring Agents

| COLORING AGENT NO. | FORMULA | NOMENCLATURE |
| --- | --- | --- |
| 1 | (structure) | 1,3,3-Trimethylspiro [2H-indole-2,3'-[3H] phenanthra(9,10b)[1,4] oxazine] |
| 2 | (structure) | 5-Chloro derivative of coloring agent No. 1 |
| 3 | (structure) | 1,3,3-Trimethylspiro [indolino-2,3'[3H]-naphtho (2,1b)(1,4)oxazine] |

-continued

Coloring Agents

| COLORING AGENT NO. | FORMULA | NOMENCLATURE |
|---|---|---|
| 4 | (structure) | 1,3,3,5,6-Pentamethylspiro[indolino-2,3'[3H]-naphtho(2,1b)(1,4)oxazine] |
| 5 | (structure) | 1,3,3-Trimethylspiro[indolino-6'-(1-piperidyl)-2,3'[3H]-napthto(2,1b)(1,4)oxazine] |
| 6 | (structure) | 3,3-Diphenyl-3H-naththo[2,1b]pyrane |

Other useful photochromic dyes include:

| NAME | MANUFACTURER | CHEMICAL TYPE |
|---|---|---|
| Blue D | (Great Lakes) | Spiroxazine |
| Red PNO | (Great Lakes) | Spiroxazine |
| Yellow L | (Great Lakes) | Chromene |
| Sea Green | (James Robinson Ltd.) | Spiroxazine |
| Berry Red | (James Robinson Ltd.) | Chromene |
| | (structure) | |

Useful radical initiators are described in Polymer Handbook, by Bandrup and Immergut, p.II-2, John Wiley (1989), for example, azobisisobutyronitrile (AIBN) and 2-2'-azobis(2-methylbutyronitrile) (AMBN).

Examples of useful chain transfer agents include, $C_4$–$C_{16}$ alkanethiols such as dodecanethiol (DDT).

The radical polymerization initiator may be present in an amount in the range of 0.05–0.5 wt %.

What is claimed is:

1. Photochromic contact lens comprising transparent organic materials having an index of refraction of more than 1.55, said material being prepared by radical polymerization of a polymerizable composition comprising:

a) 80–95 wt % of at least one monomer represented by the general formula (I):

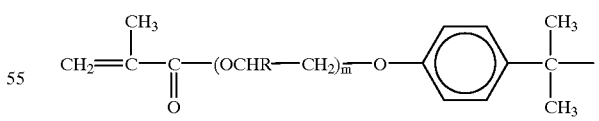

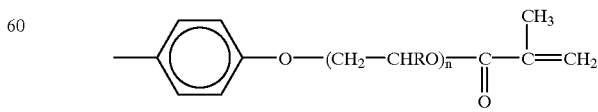

where R is H or $CH_3$ and m and n are independently 1 or 2;

b) 5–20 wt % of at least one aromatic monovinyl monomer represented by the general formula (II):

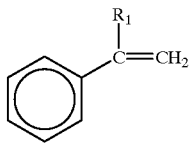

where $R_1$ is H or $CH_3$;

c) an effective amount of at least one dye that imparts photochromic properties to the materials, selected from the groups of spiroxazines, spiropyrans and chromenes;

d) an effective quantity of a chain transfer agent; and e) an effective quantity of a radical polymerization initiator; wherein the chain transfer agent is a linear alkanethiol and the radical polymerization initiator is a diazo compound.

2. Photochromic contact lens according to claim 1, wherein the polymerizable composition further comprises up to 10 wt % of an aromatic divinyl monomer represented by the general formula (III):

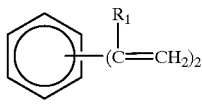

where $R_1$=H or $CH_3$.

3. Photochromic contact lens according to claim 1 or claim 2, wherein the aromatic monovinyl monomer is styrene.

4. Photochromic contact lens according to claim 1 or claim 2, wherein the chain transfer agent is a $C_4$–$C_{16}$ alkanethiol.

5. Photochromic contact lens according to claim 1 or claim 2, wherein the radical polymerization initiator is selected from the group consisting of azobisisobutyronitrile and 2,2'-azobis(2-methylbutyronitrile).

6. Photochromic contact lens according to claim 1 or claim 2, wherein the radical polymerization initiator is present in an amount in the range of 0.05–0.5 wt %.

7. Photochromic contact lens according to any one of claims claim 1 or claim 2, wherein, in formula (I), R=H and m=n=2.

* * * * *